United States Patent [19]

Kirschmann

[11] 3,980,526

[45] Sept. 14, 1976

[54] LIQUID DISTILLATION APPARATUS

[76] Inventor: John D. Kirschmann, 933 Anderson St., Bismarck, N. Dak. 58501

[22] Filed: Aug. 11, 1975

[21] Appl. No.: 603,723

[52] U.S. Cl. ............................... 202/83; 202/180; 202/181; 202/202; 202/234; 202/241; 203/14
[51] Int. Cl.² ......................................... C02B 1/08
[58] Field of Search ........................ 202/176–181, 202/202, 234, 83, 188, 241; 203/14

[56] References Cited
UNITED STATES PATENTS

| | | | |
|---|---|---|---|
| 1,762,898 | 6/1930 | Sorenson | 202/188 |
| 2,217,266 | 10/1940 | Cookson | 202/177 |
| 2,441,361 | 5/1948 | Kirgan | 202/181 |
| 2,616,839 | 11/1952 | Ames | 202/234 |
| 3,278,395 | 10/1966 | Rubinowitz | 202/234 |

*Primary Examiner*—Jack Sofer
*Attorney, Agent, or Firm*—Williamson, Bains & Moore

[57] ABSTRACT

A water distillation unit is disclosed herein. The unit preferably comprises an upper boiler container and a lower condensation container which are rigidly maintained in spaced apart relationship by a molded coupling member containing a plurality of water passageways and fittings. The coupling member is integral with the condensation container and is removably and threadably attached to the upper boiler container so that same may be easily removed when desired for cleaning. The boiler container receives raw liquid which is vaporized by an interiorly disposed heater element. The condensation container houses a condenser tube which receives steam from the boiler container and conducts distillate exteriorly of the apparatus. To improve thermal efficiency the condenser tube is cooled by raw liquid which is routed through the condensing container. Additional thermal efficiency is insured by passing the raw liquid through a preheating tube operatively associated in heat exchange relationship with the condenser tube within the condenser chamber. An orifice is provided within the boiler container for draining mineral residue solution therefrom, and means responsive to agitation of liquid within the boiler container are provided to continuously and automatically maintain fluid flow integrity through the drain orifice by preventing mineral residue buildup. The latter effect is enhanced by diluting mineral residue solution exiting from the drain orifice with the raw cooling liquid transmitted through the condensing container. An alternative embodiment of this invention employs a plurality of preferably spirally wound, vertically spaced apart vaporizing heater elements which are disposed in separately mounted immersion pans, thereby increasing liquid capacity. The latter unit additionally includes a preferably spirally wound heat exchange tube disposed within a separate heat exchange chamber through which raw liquid passes to precondense vapor, thereby enhancing thermal efficiency.

33 Claims, 8 Drawing Figures

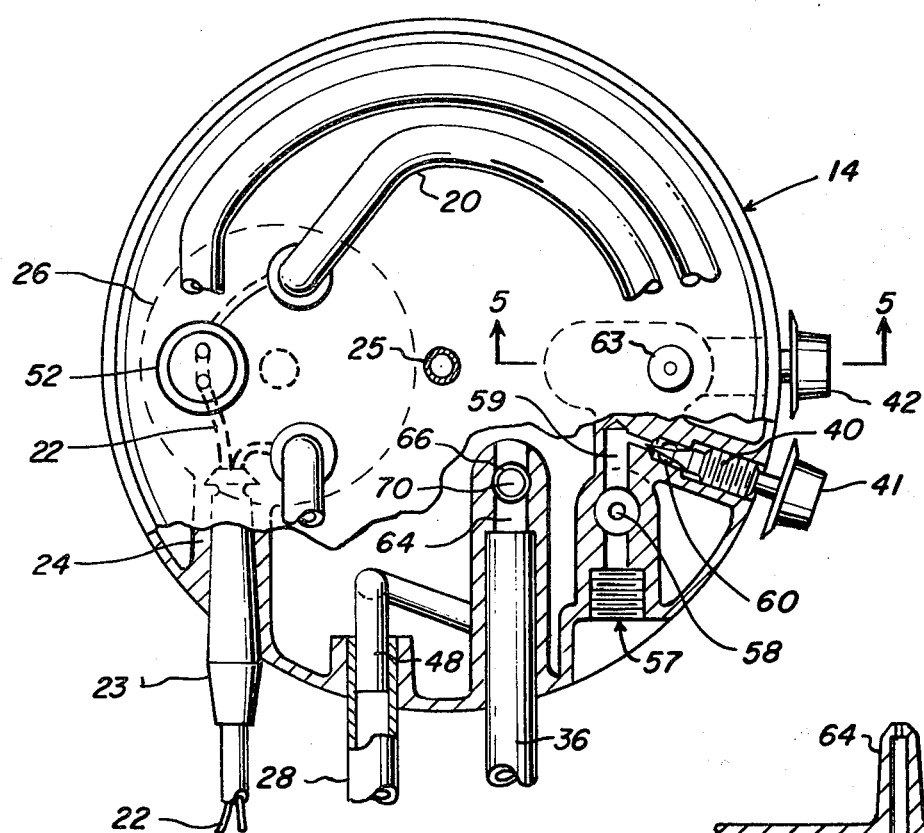
FIG. 4
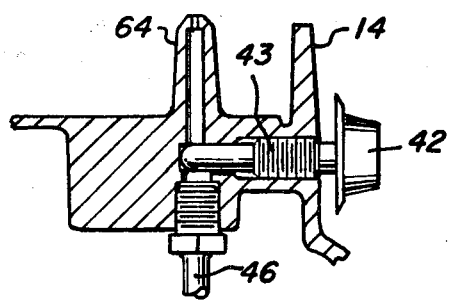
FIG. 5
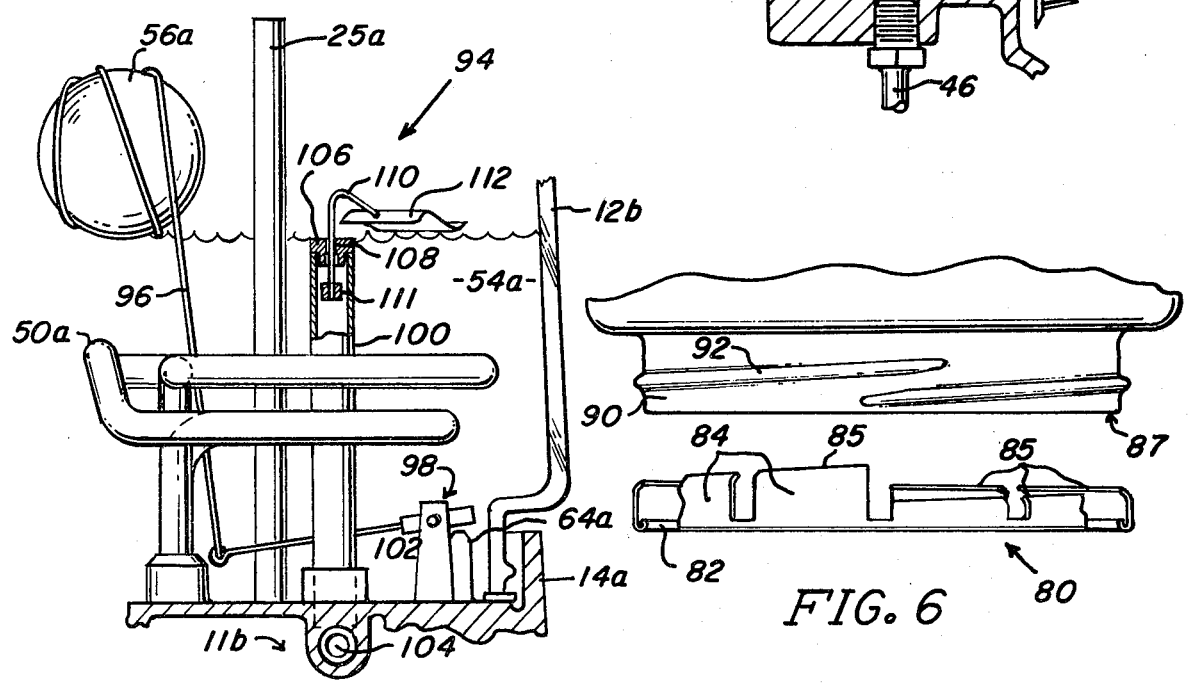
FIG. 7
FIG. 6

LIQUID DISTILLATION APPARATUS

BACKGROUND OF THE INVENTION

This invention relates broadly to the distillation of liquids. More particularly, this invention relates to portable water distillers adapted for use in the home and in commercial applications. The advantages of distilled water are becoming increasingly well known. Many local water supplies contain relatively large amounts of minerals or metals in solution. Hard water, for example, usually contains an objectionable concentration of calcium or magnesium salts. The presence of iron in solution can give water an objectionable taste and color. Soft water is known to contain, among other things, ions of sodium and sulphate. This can be objectionable, for example, for those on a sodium-free diet. Of course the presence of living organisms such as bacteria within drinking water has well known deleterious effects. Unfortunately even municipal water supplies suffer from many of the latter disadvantages. Because distilled water is substantially mineral and germ-free, it makes an ideal drinking water. Its use is also recommended in conjunction with steam irons, automobile batteries and the like.

Many water distillation systems are known in the prior art. Most of these comprise a large cylindrical outer shell which houses a plurality of axially aligned elements and various chambers and drains. Liquid distillers are shown generally in U.S. Pat. No. 1,635,112 issued to Carlson et al. on July 5, 1927; U.S. Pat. No. 2,020,948 issued to J. D. Kreis, on Nov. 12, 1935; U.S. Pat. No. 2,217,266 issued to K. Cookson on Oct. 8, 1940; U.S. Pat. No. 2,375,640 issued to R. C. Ford on May 8, 1945; U.S. Pat. No. 3,278,395 issued to L. Rubinowitz on Oct. 11, 1966; U.S. Pat. No. 3,350,279 issued to H. Tolchin on Oct. 31, 1967; U.S. Pat. No. 3,357,897 issued to A. Salzer on Dec. 12, 1967; and U.S. Pat. No. 3,694,321 issued to Marozich et al. on Sept. 26, 1972. All of the latter references employ some form of apparatus for evaporating liquid and an associated condenser for collecting distillate. The condenser may be air-cooled or it may be cooled by raw liquid entering the distillation apparatus.

A particularly vexing problem associated with many prior art liquid distillers is that they tend to become clogged or blocked up in response to mineral residue deposits. When this occurs the apparatus must of course be taken apart and cleaned. Usually a mineral residue solution drain is provided so that, as mineral residue becomes concentrated during the evaporation of raw liquid, it can be periodically drained away. Thus the Carlson '112 and Cookson '266 references, for example, disclose manually actuable valves which can be opened to drain concentrated mineral residue solution.

As mineral residue solution becomes increasingly concentrated during the distillation process the propensity for drain valves or passageways to become clogged increases radically. The minerals will block passageways by forming scaly deposits which will constrict further flow of mineral residue solution and thereby accentuate the problem. Furthermore, as mineral scale breaks loose from other sections of the apparatus and flows towards the drain, passageways are likely to become clogged by the resultant build-up of particulate matter. When further withdrawal of mineral residue solution is impossible, further distillation must be postponed until the apparatus can be thoroughly cleaned. By this time mineral deposits from minor leaks may have sealed the component parts of the apparatus together making disassembly difficult and time-consuming.

SUMMARY OF THE INVENTION

Liquid distillation apparatus disclosed herein preferably comprises a boiler container having a conventional heater tube disposed therewithin for generating steam from raw liquid, and a condenser container which encloses a conventional condenser tube which receives vapor from the boiler container. In the preferred embodiment incoming raw liquid is first directed through a preheating tube within the condenser container so that incoming liquid is first preheated to thereby increase the thermal efficiency of the distiller.

The boiler container is provided with an outlet orifice for draining the mineral residue solution produced during the distillation operation. Importantly, means are provided for maintaining fluid flow integrity through the mineral residue solution outlet orifice to prevent it from clogging up in the manner previously described. The mineral residue solution flow-maintaining apparatus preferably comprises a float which intermittently opens the outlet orifice in response to agitation of boiling liquids within the boiling container. The float prevents the flow-obstructing accumulation of mineral residue in the critical drain orifice. Unlike the floats disclosed in prior art devices, the float employed by the instant invention is not associated with a liquid inlet valve. The float is preferably associated with a tubular stem whereby the liquid level within the boiler container is regulated while fluid flow integrity through the stem and the outlet orifice is automatically maintained. A float support wire linked to the float preferably penetrates the critical outlet orifice to prevent mineral residue build up as the float moves in response to agitation of fluid within the boiler container.

In an alternative embodiment of this invention mineral residue build up around the critical outlet orifice is prevented by a vane member which has a portion thereof occupying a substantially horizontal plane and a portion thereof occupying a substantially vertical plane. The vane member is preferably attached to a wire linkage which has an end thereof extending through the outlet orifice. The vane is preferably disposed at the liquid vapor interface within the boiler container, and it moves up and down and rotates slightly in response to agitation of liquid. The resultant movement of the link wire constantly maintains fluid flow integrity through the outlet orifice by preventing undue constriction from mineral residue deposits. A tubular stem is provided and extends upwardly in substantially vertical relationship within the boiler container. The upper portion of the stem is provided with a mineral residue solution admission orifice through which the vane link extends. The stem thus maintains a desired residue solution fluid level within the boiler container, while the vane member maintains fluid flow integrity through the admission orifice by preventing undue buildup of mineral residue deposits.

In the preferred embodiment this invention utilizes a mixing technique whereby the previously described mineral residue draining function is enhanced. A portion of the cooling liquid which exits from the condensing chamber is mixed with the mineral residue solution which is draining from the boiler container. The diluted mineral residue solution is then discharged through an appropriate waste hose. Flushing the mineral residue drain in this manner enhances the reliability of the drain outlet and thus the reliability of the apparatus.

In the preferred embodiment of this invention the condensing container is integral with a molded coupling member in which a plurality of fittings and passageways are interiorly disposed. A threaded coupling portion integral with the coupling member matingly receives the threaded boiler container to maintain same in spaced apart vertical relationship with the lower condensing container. The upper threaded portion of the coupling member is preferably vertically slotted to thereby form a plurality of circumferentially spaced apart tabs, the upper edges of which are bent inwardly to define a thread. The latter construction prevents freeze-up between the boiler jar and the coupling member when mineral residue deposits form between the various threads. In this manner disassembly of the apparatus for eventual cleaning is greatly facilitated.

In an alternative embodiment of this invention the upper boiler chamber includes a plurality of coiled heater elements which are disposed in separately mounted vertically spaced apart immersion trays. The latter construction greatly increases the volume of liquid which can be distilled by the apparatus. The latter apparatus also includes a separate heat exchange chamber disposed between the upper boiler container and the lower condensation container. To improve the thermal efficiency of the apparatus, raw liquid is first passed through a preferably spirally wound tube located within the heat exchange chamber to be preheated by steam directed therethrough. The chamber thus functions to precondense steam generated in the boiler container while at the same time preheating the raw liquid before same is delivered to the upper immersion pans for evaporation by the heater elements.

Thus it is a fundamental object of this invention to provide a reliable liquid distiller.

More particularly, it is an object of this invention to provide a liquid distiller having a mineral residue drain outlet which will not become blocked by residue buildup during normal use. It is an important feature of this invention that means are provided for automatically maintaining fluid flow integrity through the said outlet orifice even when mineral deposits are accumulated within the apparatus.

Another object of this invention is to provide a liquid distiller of the character described having maximum thermal efficiency. In one form of this invention raw liquid is first directed through a preheating tube within the condensing container to cool the condenser tube and to thereby become preheated. In another form of this invention thermal efficiency is maximized by precondensing steam.

Another object of this invention is to provide a liquid distiller which constantly flushes the mineral residue drain. It is an important feature of this invention that a portion of the raw cooling liquid exiting from the condensing chamber is mixed with mineral residue solution draining from the boiler container to dilute the same and help prevent mineral residue deposits from constricting the drainage passageways.

Still another object of this invention is to provide a liquid distiller of the character described which may easily be taken apart for normal cleaning and maintenance. It is a feature of this invention that the upper boiler container is provided with a threaded portion which is removably, matingly received by a similarly threaded portion on a molded coupling collar. Since the threaded portion of the coupling collar consists of a plurality of vertically slotted tabs, mineral residue deposits will not lock the containers in engagement with the coupling collar.

Yet another object of this invention is to provide a liquid distiller of the character described above which is ideally suited for use in the home. The relatively light weight of the subject invention as well as the ease with which it may be disassembled for cleaning and maintenance are particularly desirable features.

Another object of this invention is to provide a distiller of the character described which will provide distilled water from raw water containing a wide variety of mineral deposits.

A still further object of this invention is to provide a liquid distiller with means for removing objectionable taste from distilled water produced thereby. It is a feature of this invention that the distilled water may be filtered to remove objectionable tastes.

A related object of this invention is to provide a distiller of the character described with a filter which will not contribute to unsafe internal pressure buildup. It is a feature of the instant apparatus that the filter preferably included therewith is vented to the atmosphere to allow discharge of steam.

These and other objects of this invention along with advantages appurtenant thereto will appear or become apparent in the course of the following description.

BRIEF DESCRIPTION OF THE DRAWINGS

FIG. 4 is a cross sectional, partly cutaway view of the molded coupling member taken along lines 3—3 of FIG. 2;

FIG. 5 is a cross sectional view of a metering valve taken along line 5—5 of FIG. 4;

FIG. 6 is an exploded, partial plan view showing the threaded portion of the lower molded coupling member and the threaded portion of the boiler container which engages same;

FIG. 7 is a cross sectional view showing an alternative means for maintaining uninterrupted mineral residue solution flow.

DETAILED DESCRIPTION

Figure 1:
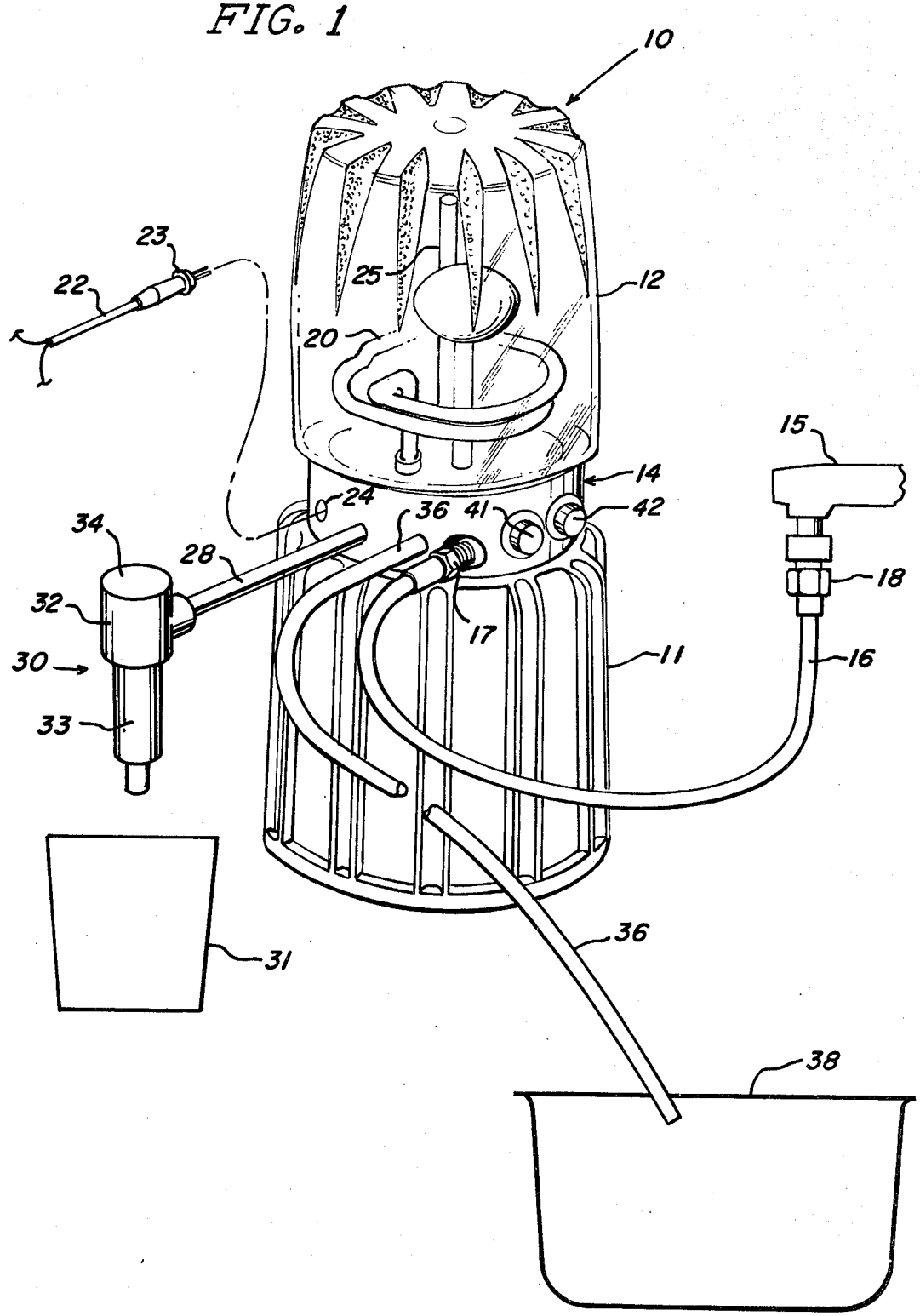
FIG. 1 is a perspective view of the preferred form of the liquid distillation apparatus comprising this invention.

Referring now to FIG. 1, liquid distillation apparatus constructed in accordance with the teachings of this invention has been generally identified by the reference numeral 10. Apparatus 10 includes a lower, generally cylindrical condensing container 11, which is adapted to be disposed on a supporting surface, and an upper, generally cylindrical boiling container 12. Container 11 actually comprises a molded base having an upper coupling portion in the form of a collar 14 integral therewith. As will be described in more detail later, coupling portion 14 includes a plurality of fittings and passageways for properly directing the flow of fluid, and it is threadably attached to boiling container 12.

Apparatus 10 is adapted to be connected to a conventional source of liquid such as faucet 15. For this purpose a flexible feed liquid inlet hose 16 extends between coupling member 14 and faucet 15, being connected thereto by conventional fittings 17 and 18 respectively. As will be described in more detail later, raw liquid (i.e. water) incoming through hose 16 is vaporized within container 12 by the heating action of a coiled, heating element 20. Element 20 is electrically connected to a source of electricity (preferably 120 volts A.C.) through a conventional electrical power cord 22. Cord 22 has a conventional leak-proof coupling portion 23 which is matingly received within a passage 24 formed in coupling collar 14. Steam or vapor produced within container 12 is conducted through a vapor passage tube 25 into the lower condensing container 11 where it is cooled and condensed to a liquid. Distilled liquid thus produced is then conducted through a preferably flexible hose 28 to a filter 30, which directs distilled liquid into a conventional container 31.

Filter 30 comprises an upper, open-ended reservoir portion 32 and an integral, lower portion 33 which preferably contains charcoal filter granules or the like. An upper orifice 34 within reservoir 32 vents incoming vapors so that dangerous internal pressure buildups are avoided. The charcoal filter just described is of particular utility when, for example, raw water contains vaporous or gaseous impurities. It may be omitted if desired.

A preferably flexible waste hose 36, which extends outwardly from coupling portion 14, conducts waste liquids into a collecting container 38; or such liquids may be disposed of through a drain or the like. As will be described in more detail later, the contents of hose 36 comprise a portion of the raw water entering the apparatus through hose 16 and used for flushing, as well as mineral residue which is continuously and automatically passed by the apparatus. A conventional metering valve 40 (FIG. 4) within coupling collar 14 and actuated by a knob 41 will control the rate at which raw liquid is directed into container 11 for cooling purposes. Similarly, knob 42 actuates a metering valve 43 (FIG. 5) for controlling the amount of liquid entering the boiling chamber 12a (defined by boiling container 12).

A generally spirally wound condensing tube 47 located within condensing chamber 11a has an output end 48 (FIG. 2) which attaches conventionally to hose 28. The other end of the condensing tube extends vertically upwardly through the apparatus, consisting of a portion 25a in condensing chamber 11a and an upper, integral vapor passageway portion 25 within boiler chamber 12a. An upper winding of condensing tube 47 abuts the single winding of preheating tube 46 and is in heat exchange relationship therewith.

As noted above, boiling chamber 12a includes a generally coiled heater element 20 which is powered by electricity supplied through cord 22. Cord 22 is connected by electrical coupling 23 to power supply cord 22 as indicated in FIG. 4. A conventional thermostat 52 abuts the upper turn of coil 20 and controls maximum temperature thereof in a conventional manner. Liquid within chamber 12a (identified generally by reference numeral 54) is continually vaporized by element 20 and vapor enters the vapor passage tube 25 at the upper portion of chamber 12a. The level of the liquid within the chamber 12a is determined by a float 56 in a manner which will be described in more detail later.

Figure 2:
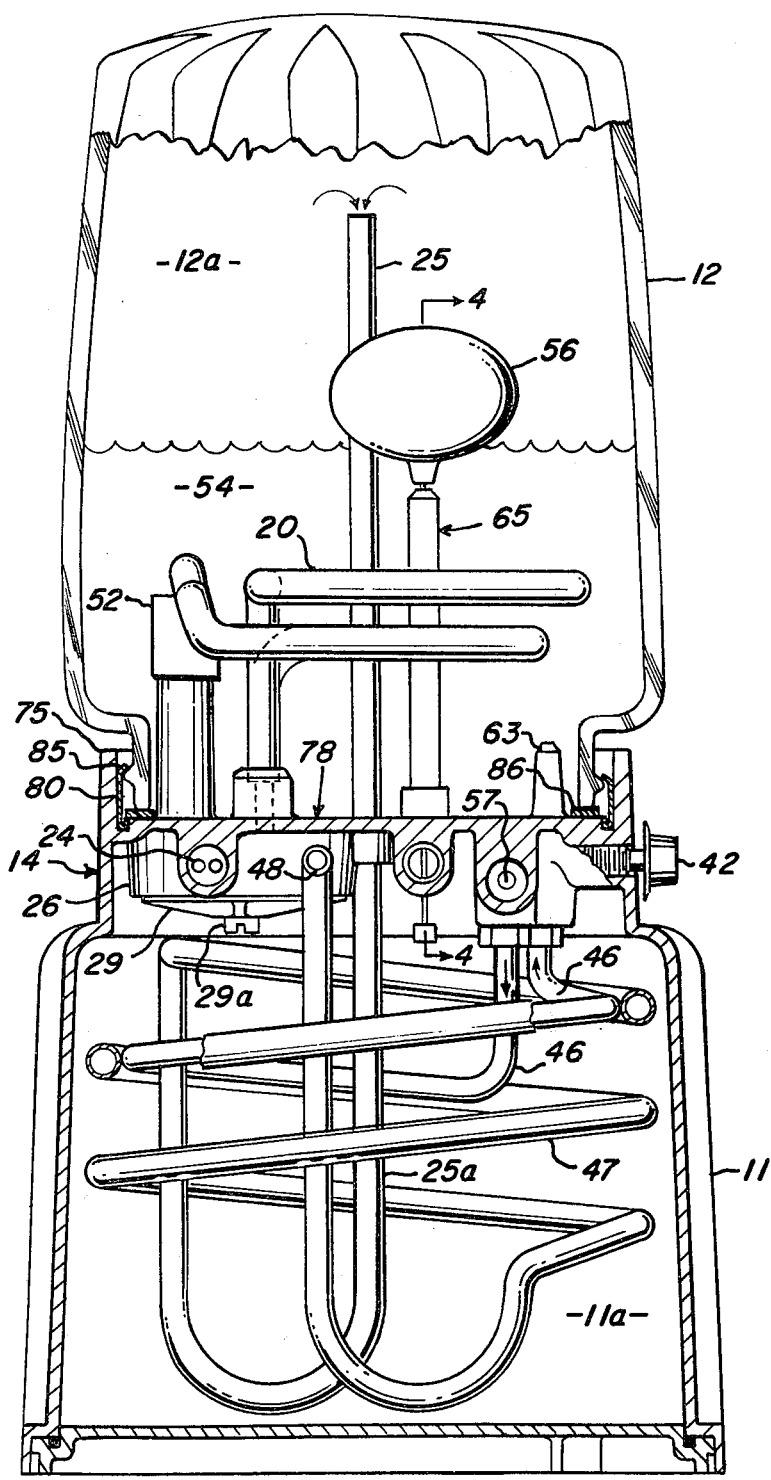
FIG. 2 is a vertical cross sectional view of the distillation apparatus shown in FIG. 1.

Raw liquid entering apparatus 10 through input orifice 57 from feed hose 16 (FIGS. 2 and 4) is divided into two portions. A first portion is directed downwardly through orifice 58 into preheating tube 46 and a second portion is directed through passageway 59 to metering valve 40. The setting of metering valve 40 (via adjustment to knob 41) determines the amount of raw liquid which will be directed into condensing chamber 11a through an orifice 60 (FIG. 4) and used for cooling and flushing. As liquid within chamber 11a rises, it will be exited from the apparatus through an orifice 62 (FIG. 3) and a drain passageway 64 which connects to waste hose 36. That portion of raw water transmitted through preheating tube 46 will be conducted to boiler chamber 12a through a nozzle 63 connected to the outlet end of tube 46 (FIGS. 2 and 5). The amount of raw liquid transmitted through nozzle 63 is controlled by metering valve 43 actuated by hand knob 42. When heater element 20 is immersed by the rising liquid within chamber 12a, it is energized by thermostat 52. The liquid in chamber 12a is heated and the vapor produced thereby will be transmitted through vapor passage tube 25 into the condenser tube 47, where condensation will occur because of the heat exchange provided by cooling liquid within chamber 11a. Usable distilled liquid is directed out through condenser tube end 48 and hose 28.

Figure 3:
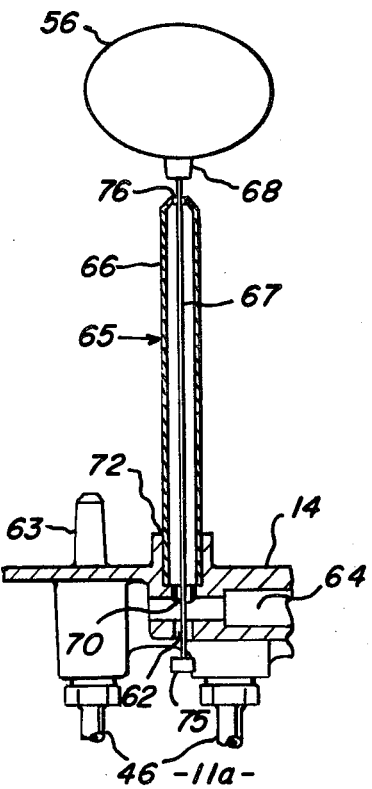
FIG. 3 is a cross sectional view of the means employed by the instant invention to maintain uninterrupted mineral residue solution flow, and is taken along line 4—4 of FIG. 2.

The liquid 54 within chamber 12a continually becomes concentrated with mineral residue as vaporization progresses. The mineral residue solution created during the distillation process is continuously and automatically drained from the apparatus by a drain-maintaining apparatus 65. Apparatus 65 comprises a conventional float 56, a tubular stem 66, an elongated agitation wire 67 which is fastened to a lower portion 68 of the float and extends axially through stem 66, and an outlet orifice 70 which receives the lower end 72 of the stem 66. As best seen in FIG. 3, wire 67 extends vertically downwardly through coupling collar 14 and through the orifice 62 into chamber 11a, being secured therewithin by a retainer cap 75 which prevents the float from becoming dislodged. A very small mineral residue solution admission orifice 76 provided at the top of stem 66, which is somewhat larger than the diameter of the wire 67 which extends therethrough, controls the level of liquid 54 by draining same.

In response to agitation from the boiling liquid 54 within a chamber 12a, float 56 will be moved up and down in a vertical direction and bounced about horizontally. When cap portion 68 of float 56 is displaced upwardly with respect to admission orifice 76, mineral residue will drain through stem 66 and orifice 70, and out passageway 64. When float 56 lowers, cap 68 will temporarily block admission orifice 76. In this manner the liquid level within chamber 12a will be controlled. Importantly, mineral residue deposits which would otherwise tend to clog or block admission orifice 76 and/or outlet orifice 70 are obviated by the constant movement of agitator wire 67.

Mineral residue buildup and the passageway clogging associated therewith is further obviated by a mixing or flushing technique employed by the instant invention. As described earlier, that portion of the incoming raw liquid utilized for cooling purposes in chamber 11a exits from apparatus 10 through orifice 64 via orifice 62. Thus, a portion of raw liquid incoming to apparatus 10 is mixed within passageway 64 with concentrated mineral residue solution being delivered thereto through stem 66 and orifice 70. It has been found that residue deposits which otherwise form in the critical mineral residue solution output passageway 64 are substantially reduced by this latter construction.

Referring now to FIGS. 6 and 2, it will be seen that coupling collar 14 includes an upper annular lip portion 75 which extends vertically upwardly a predetermined offset distance from the flat, circular wall portion 78 of coupling collar 14. The shoulder formed between annular lip 75 and wall 78 is adapted to receive a circular, preferably metallic thread member 80. Thread 80 comprises a circumferential reinforced ring portion 82 and a plurality of tabs 84 which have upward portions 85 thereof bent inwardly so as to define a thread. As will be noted from FIG. 6, succeeding spaced apart tabs 84 increase in height sequentially along the circumference of member 80 such that tab edge portions 85 define a conventional spiral thread. Boiler container 12 has an integral rim portion 90 which includes a thread 92 for engaging the thread formed by tab edges 85. A circular gasket 86 provides a leakproof seal between surface 78 and edge 87 of ring 90. In this manner boiler container 12 is twistably fastened to the lower unit, and it may easily be removed where necessary for cleaning. The electrical components and connections for electrical heating element 20 and thermostat 52 are contained within a hermetically sealed housing 26. Access may be obtained to the electrical connections within housing 26 by removing sealing lid 29 held in place by screw fastener 29a. Housing 26 is affixed to the underside of wall portion 78 separating boiling chamber 12a from condensing chamber 11a.

In FIG. 7 an alternative means for providing fluid flow integrity through a mineral residue drain orifice is shown. The slightly modified system 94 includes a boiler container 12b which is fastened to molded coupling member 14a in the manner previously described. Similarly, a heater coil 20a generates vapor from liquid 54a which is transmitted into a lower condenser chamber area 11b through passage tube 25a. A float 56a (not part of the mineral residue solution flow-maintaining means 94) maintains the level of liquid 54a in a conventional manner by selectively blocking an input nozzle 63a through a conventional linkage 96 and pivot assembly 98.

Tubular stem 100 extends upwardly from a fitting 102 and is in fluid flow communication with a mineral residue drain outlet 104. A cap portion 106, which is fitted on top of tube 100, has a small mineral residue admission orifice 108 formed therein. An agitating member 110, which preferably comprises a piece of wire or the like, extends through orifice 108 into tube 100 and is secured by a cap 111 which prevents dislodging of same. Member 110 rigidly connects to a preferably metallic vane 112 which may be randomly bent and oriented such that it will have a planar portion in both horizontal and vertical planes (as viewed in FIG. 7). Vane 112 lies substantially at the liquid-vapor interface within boiler container 12b, and in response to liquid agitation it will move vertically upwardly and downwardly and it will rotate somewhat in the horizontal plane. As vane 112 moves, agitation member 110 will constantly move about within mineral residue admission orifice 108, thereby preventing the flow obstructing buildup of mineral residue deposits therein. It will be apparent from inspection and comparison between FIGS. 2 and 7 that the apparatus of FIG. 2 performs the same function of the apparatus of FIG. 7 except that, in the first described embodiment, the float 56a and the vane 112 have been effectively combined in one improved unit. Of course the mixing or flushing technique discussed earlier in conjunction with FIGS. 3 and 4 utilizing the outward flow of cooling liquid from chamber 11a is of equal utility when employed in conjunction with the structure 94 of FIG. 7. For such purposes, orifice 62 would open into outlet drain passage 104.

Figure 8:
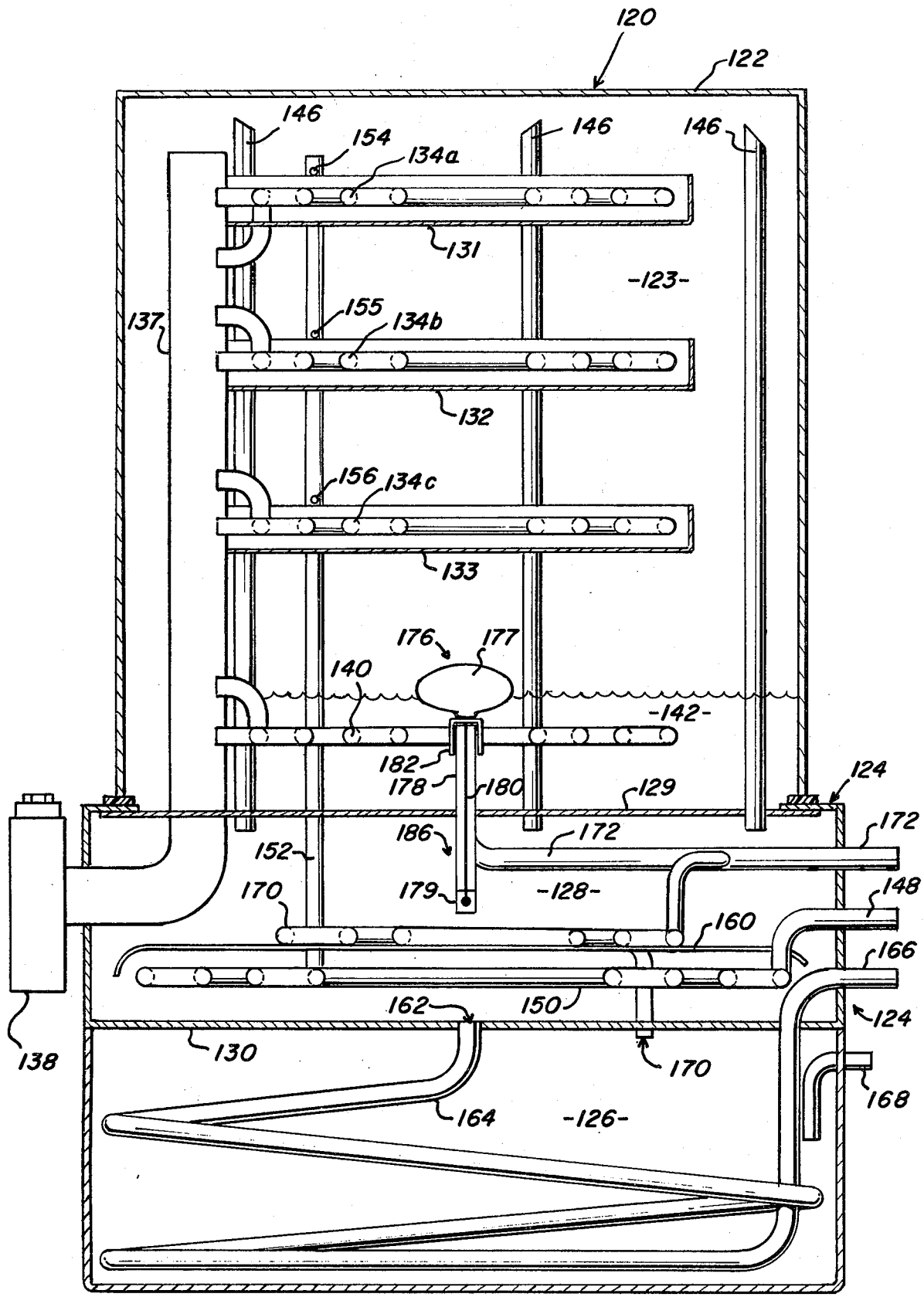
FIG. 8 is a cross sectional view of a modified distiller constructed in accordance with the teachings of this invention.

In FIG. 8 an alternative embodiment of a liquid distiller is shown. Distiller 120 comprises an upper, preferably metallic boiler container 122 (which defines a boiler chamber 123) and a lower unit 124 to which container 122 is rigidly mounted. Unit 124 defines a lower condensing chamber 126 and an upper vapor passage chamber 128 which is separated from chambers 123 and 126 by partition walls 129 and 130 respectively. Boiler chamber 123 contains a plurality of vertically spaced-apart, liquid immersion pans 131 – 133, each of which contains similar, preferably spirally wound, conventional heating coils 134a – 134c. Pans 131 through 133 are mechanically supported by a stanchion 137 which extends vertically upwardly interiorly of chamber 123. Coils 134a–c are electrically energized in a conventional manner. Electrical lead lines for heating elements 134a–c are directed through stanchion 137 from a main electrical junction box 138. A lower heating coil 140 is immersed in the liquid 142 at the bottom of chamber 130 and a separate immersion pan therefore is unnecessary. In response to energization of the heating coils within container 122, the liquid 142 will be vaporized, and vapors will be transmitted through vapor passage tubes 146 into the vapor passageway chamber 128 beneath boiler chamber 123.

Liquid is directed to the distiller 120 through an input line 148 which leads to a preferably spirally coiled heat exchange or pre-condensing tube 150 located near the bottom of chamber 128. Coil 150 has an upwardly extending vertical portion 152 integral therewith which delivers preheated raw liquid into immersion pans 131 – 133 via a plurality of output orifices 154 – 156 respectively. Incoming liquid which overfills the immersion pans will drop to the bottom of boiler chamber 130 resulting in the liquid level 142.

Because of the cool raw liquid being transmitted through coil 150, vapors within chamber 128 will be precooled thereby so that thermal efficiency of the unit is increased. It has been found that thermal efficiency with this construction is maximized by the placement of a vapor deflector baffle 160 over the upper regions of coil 150 such that vapors must contact the coil 150 near the bottom regions of chamber 128. Distilled liquid and remaining vapors are transmitted via an input orifice 162 into a condenser coil 164 located within condensing chamber 126. Final condensation of vapor to liquid and cooling of the distilled liquid is accomplished in coil 164 by heat exchange with cooling liquid maintained in chamber 126. Distilled liquid is then discharged from the apparatus through an outlet pipe 166 which is integral with the coil 164. Cooling liquid is admitted into chamber 126 via a cooling liquid inlet pipe 168. This liquid may be drawn from the stream of raw water to be distilled. As the liquid level within chamber 126 rises, cooling liquid will be discharged from the apparatus through a preferably coiled cooling water outlet pipe 170 which connects to a waste discharge pipe 172. Heat exchange provided by pipe 170 with vapors within chamber 128 increases the thermal efficiency of the apparatus 120.

Distiller 120 preferably includes the mineral residue solution draining apparatus described earlier in conjuction with FIGS. 1 through 6. Apparatus 176 includes a float 177, a tubular stem 178, and the waste discharge tube 172. Float 177 is connected to an agitation member 180 which preferably comprises an elongated metallic wire and which extends downwardly through tube 178 abd into chamber 128 being retained therewithin by a cap 179. An admission orifice defined by the upper end of tube 178 is selectively blocked and unblocked by the vertical motion of float 177 in response to variations in the level of liquid within chamber 123. This is accomplished by a cap 182 which covers the upper end of tube 178 and is fixed to the bottom of float 177. Again, the buildup of mineral residue which might otherwise clog the admission orifice is prevented by the constant agitation action of member 180. It is apparent that the lower end 186 of the stem 178 is in fluid flow communication with drain tube 172. The latter described drain outlet means may, of course, take on a variety of configurations, but in any event it is contemplated that a float 177 together with an agitation member 180 will prevent mineral residue solution buildup and hence clogging of the residue drain apparatus. Because of the spaced apart immersion pans and the multiplicity of coiled heater elements disposed therewithin, the thermal efficiency of the unit as well as the liquid treating capacity is greatly increased. Thus, because of the consequent greater buildup of mineral residue solution, the means 176 for maintaining uninterrupted mineral residue solution flow through the drain outlet 172 is of the utmost importance and utility. The distillation capacity unit 120 may be varied by using a predetermined number of immersion pans and heater elements.

From the foregoing, it will be seen that this invention is one well adapted to attain all of the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a lmiting sense.

What is claimed is:

1. Liquid distillation apparatus comprising:
    a boiler container having outlet orifice means for draining mineral residue solution therefrom;
    means for conducting raw liquid into said boiler container; heater means for evaporating said raw liquid thereby producing vapor; means for condensing said vapor, said condenser means having a distillate output;
    vapor passage means extending between said boiler container and said condenser means; and
    means for maintaining uninterrupted mineral residue solution flow through said outlet orifice means in response to agitation by fluid within said boiler container.

2. The combination as in claim 1 including means for directing a cooling fluid in heat exchange relation with said condenser means to facilitate condensation of vapor therein.

3. The combination as in claim 2 wherein said condenser means comprises a tube, and said means for directing a cooling fluid in heat exchange relation therewith comprises a second container through which said condenser tube passes.

4. The combination as in claim 1 including means for filtering said distillate output, said filtering means including vapor ventilation means for preventing excessive pressure buildup.

5. The combination as in claim 1 wherein said mineral residue solution flow-maintaining means comprises float means for intermittently opening said outlet orifice means in response to said fluid agitation whereby the movement of said float means prevents the flow obstructing accumulation of mineral residue in said orifice means.

6. The combination as in claim 5 including:
    a tubular stem having a first end defining an outlet orifice and a second end having a mineral residue solution admission orifice;
    means connected to said float means for intermittently blocking said admission orifice; and
    elongated support means fastened to said float means and extending through said stem and said admission orifice for preventing the accumulation of mineral residue deposits therein.

7. The combination as in claim 6 including valve means in fluid flow communication with said raw liquid conducting means for selectively controlling the rate at which raw liquid enters said boiler container.

8. The combination as in claim 1 wherein said mineral residue solution flow-maintaining means comprises an agitating member extending into said outlet orifice means and a fluid responsive member in said boiler container movable by fluid agitation and linked to said agitating member for moving same in response to fluid agitation resulting from boiling action within said boiler container, whereby the movement of said agitating member prevents the flow-obstructing accumulation of mineral residue in said orifice means.

9. The combination as in claim 8 wherein said fluid responsive member comprises vane means having at least a portion thereof lying in a substantially horizontal plane and at least a portion thereof lying in a substantially vertical plane whereby agitation of said liquid by boiling action causes rotational deflection and an up and down vertical deflection of said vane means and said agitating member.

10. The combination as in claim 8 wherein said fluid responsive member is located at substantially the liquid-vapor interface at the surface of the boiling liquid within said boiler container.

11. The combination as in claim 10 wherein said fluid responsive member is a float.

12. The combination as in claim 1 wherein said mineral residue solution flow-maintaining means comprises:
    tubular stem means having a first end defining an outlet orifice and a second end having at least one mineral residue admission orifice therein, said orifices comprising said orifice means;

an agitating member extending through said mineral residue admission orifice; and vane means linked to said agitation member for moving same in response to said fluid agitation whereby the movement of said agitating member prevents the flow-obstructing accumulation of mineral residue in said mineral residue admission orifice.

13. The combination as in claim 12 wherein said vane means has at least a portion thereof lying in a substantially horizontal plane and at least a portion thereof lying in a substantially vertical plane whereby agitation of said liquid causes rotational deflection and an up and down vertical deflection of said agitating member.

14. The combination as in claim 13 wherein said vane means is located at substantially the liquid-vapor interface at the surface of the boiling liquid within said boiler container.

15. A liquid distiller comprising:

a vapor generating chamber having a drain outlet for discharging mineral residue solution;

means for inputting raw liquid into said vapor generating chamber;

heater means for evaporating liquid, said heater means disposed within said vapor generating chamber;

a condensation chamber having a cooling liquid input orifice and a cooling liquid output orifice, said input orifice adapted to be connected to a source of cooling liquid;

vapor condensation means disposed within said condensation chamber in heat exchange relation with cooling liquid within said condensation chamber, said condensation means being in fluid flow communication with said vapor generating chamber and having a distillate output; and mixing means for receiving a portion of said cooling liquid discharged through said cooling liquid output orifice and mineral residue discharged through said drain outlet, said mixing means having an output for discharging waste exteriorly of said apparatus.

16. The combination as in claim 15 including means for maintaining uninterrupted mineral residue solution flow through said drain outlet in response to agitation from fluid within said boiler container.

17. The combination as in claim 16 wherein said mineral residue solution flow-maintaining means comprises float means for intermittently opening an admission orifice in fluid flow communication with said drain outlet in response to said fluid agitation whereby the movement of said float means prevents the flow-obstructing accumulation of mineral residue in said orifice.

18. The combination as in claim 16 wherein said mineral residue solution flow-maintaining means comprises mineral residue solution passage means in fluid flow communication with said drain outlet, an agitating member extending into said passage means and fluid responsive means in said vapor generating chamber linked to said agitating member for moving same in response to said fluid agitation whereby the movement of said agitating member prevents the flow-obstructing accumulation of mineral residue in said passage means.

19. The combination as in claim 16 wherein said mineral residue solution flow-maintaining means comprises:

tubular stem means having a first end defining said drain outlet and a second end having at least one mineral residue admission orifice therein;

an agitating member extending through said mineral residue admission orifice; and a fluid responsive member in said vapor generating chamber movable by fluid agitation and linked to said agitation member for moving same in response to said fluid agitation whereby the movement of said agitating member prevents the flow-obstructing accumulation of mineral residue in said mineral residue admission orifice.

20. The combination as in claim 18 wherein:

said mixing means comprises a mixing chamber connected to said drain outlet and said cooling liquid output orifice.

21. A liquid distiller comprising:

a steam generating container having a first rigid coupling portion integral therewith;

raw liquid inlet means connected to said steam generating container;

heating means disposed within said steam generating container for evaporting said raw liquid;

a condensing container;

means for condensing vapor within said condensing container, said condensing means having a distillate discharge outlet;

vapor passage means extending between said steam generating container and said condensing means; and coupling means between said generating container and said condenser container tightly securing said containers together, said coupling means including a second coupling portion matingly engaging said first coupling portion, and said coupling means defining a fluid connection zone having fluid connection means to which said raw liquid inlet means and said distillate discharge outlet are connected between said containers.

22. A liquid distiller as defined in claim 21 wherein a cooling fluid inlet and a cooling fluid outlet are connected to said condensing container for conducting a cooling fluid in heat exchange relation with vapor in said condensing means, said coupling means having fluid connection means to which said cooling fluid inlet and outlet are connected.

23. A liquid distiller as defined in claim 21 wherein said steam generating container has mineral residue solution drain outlet means and means for maintaining uninterrupted mineral residue solution flow therethrough in response to agitation by fluid within said generating container.

24. A liquid distiller as defined in claim 23 wherein said coupling means further includes waste fluid outlet connection means to which said drain outlet means is connected.

25. A liquid distiller as defined in claim 21 wherein said steam generating container is coupled on top of said condensing container and said vapor passage means extends vertically therebetween.

26. A liquid distiller as defined in claim 21 wherein said first and second coupling portions are threaded members.

27. A liquid distiller as defined in claim 26 wherein said coupling means comprises a collar integrally formed on one end of said condensing container, said collar including wall means forming a fluid separator between said containers.

28. A liquid distiller as defined in claim 26 wherein one of said threaded coupling portions is slotted at circumferentially spaced locations thereon to provide a plurality of circumferentially spaced apart tabs on which a thread is formed, thereby avoiding freeze-up between said containers which mineral residue accumulates on said threaded members.

29. Distillation apparatus adapted to be connected to a source of raw liquid, said apparatus comprising:

- a vapor generating chamber having drain outlet means for discharging mineral residue solution therefrom;
- a plurality of spaced apart immersion pans disposed within said generating chamber for receiving said raw liquid;
- a plurality of heater elements for producing vapor, each one of said plurality of heater elements disposed within a corresponding one of said immersion pans;
- means for condensing said vapor;
- condensing means comprising a condensing chamber and a condenser tube disposed within said condensing chamber; and
- a separate vapor passage chamber disposed between said generating chamber and said condensing chamber, said vapor passage chamber being in fluid flow communication with said condenser tube and adapted to receive vapor from said generating chamber.

30. Distillation apparatus as defined in claim 29, and further including heat exchange tube means for conducting raw liquid through said vapor passage chamber to thereby preheat said raw liquid and pre-condense said vapor passing through said chamber.

31. Distillation apparatus as in claim 29 and further including means for maintaining uninterrupted mineral residue solution flow through said drain outlet means comprising float means for intermittently opening said drain outlet means in response to said fluid agitation whereby the movement of said float means prevents the flow obstructing accumulation of mineral residue in said orifice.

32. Distillation apparatus as in claim 31 including:

- a tubular stem having a first end defining a drain outlet and a second end having a mineral residue solution admission orifice;
- cap means linked to said float means for intermittently blocking said admission orifice; and
- agitation means fastened to said float means and extending through said stem and said admission orifice for preventing mineral residue buildup therein.

33. Distillation apparatus as defined in claim 31 wherein said drain outlet means comprises a flow passage extending from said vapor generating chamber through said vapor passage chamber to an external discharge point.

* * * * *